US007955002B2

(12) United States Patent
Xia et al.

(10) Patent No.: US 7,955,002 B2
(45) Date of Patent: Jun. 7, 2011

(54) OPTICAL SIGNAL MEASUREMENT DEVICE

(75) Inventors: Tiejun J. Xia, Richardson, TX (US);
Glenn A. Wellbrock, Wylie, TX (US);
Timothy E. Lawter, Lake Mary, FL
(US); Robert H. Mills, Oviedo, FL
(US); Gary E. Myrland, Winter Springs,
FL (US)

(73) Assignee: Verizon Patent and Licensing Inc.,
Basking Ridge, NJ (US)

( * ) Notice: Subject to any disclaimer, the term of this patent is extended or adjusted under 35 U.S.C. 154(b) by 1205 days.

(21) Appl. No.: 11/612,218

(22) Filed: Dec. 18, 2006

(65) Prior Publication Data
US 2008/0298802 A1    Dec. 4, 2008

(51) Int. Cl.
*G02B 6/36*    (2006.01)
*G02B 6/12*    (2006.01)

(52) U.S. Cl. ............................................ 385/89; 385/14
(58) Field of Classification Search .................... 385/89, 385/14
See application file for complete search history.

(56) References Cited

U.S. PATENT DOCUMENTS

| 4,332,469 | A | * | 6/1982 | Wendland | 356/222 |
|---|---|---|---|---|---|
| 4,854,667 | A | * | 8/1989 | Ebata et al. | 385/134 |
| 4,884,809 | A | * | 12/1989 | Rowan | 463/47.3 |
| 4,893,815 | A | * | 1/1990 | Rowan | 463/47.3 |
| 4,927,266 | A | * | 5/1990 | Sugiura et al. | 356/243.1 |
| 5,202,812 | A | * | 4/1993 | Shinoda et al. | 361/65 |
| 5,455,672 | A | * | 10/1995 | Lamonde et al. | 356/73.1 |
| 5,521,701 | A | * | 5/1996 | Felger et al. | 356/218 |
| 5,570,176 | A | * | 10/1996 | Noel | 356/73.1 |
| 5,572,438 | A | * | 11/1996 | Ehlers et al. | 700/295 |
| 5,583,764 | A | * | 12/1996 | Nail et al. | 702/2 |
| 5,591,964 | A | * | 1/1997 | Poole | 250/227.14 |
| 5,592,284 | A | * | 1/1997 | Bedard | 356/73.1 |
| 5,708,265 | A | * | 1/1998 | Poole | 250/227.14 |
| 5,745,624 | A | * | 4/1998 | Chan et al. | 385/91 |
| 5,825,516 | A | * | 10/1998 | Walsh | 398/40 |
| 5,838,589 | A | * | 11/1998 | Nail et al. | 700/286 |
| 6,177,988 | B1 | * | 1/2001 | Dubnack et al. | 356/216 |
| 6,304,350 | B1 | * | 10/2001 | Doerr et al. | 398/9 |
| 6,574,652 | B2 | * | 6/2003 | Burkhard | 718/1 |
| 6,676,307 | B1 | * | 1/2004 | Yang et al. | 385/96 |
| 7,434,116 | B2 | * | 10/2008 | Franke et al. | 714/704 |
| 7,477,285 | B1 | * | 1/2009 | Johnson | 348/143 |
| 7,756,418 | B2 | * | 7/2010 | Ofalt et al. | 398/25 |
| 2002/0002426 | A1 | * | 1/2002 | Burkhard | 700/286 |
| 2003/0031398 | A1 | * | 2/2003 | Franke et al. | 385/12 |
| 2004/0170369 | A1 | * | 9/2004 | Pons | 385/135 |
| 2005/0177027 | A1 | * | 8/2005 | Hirata | 600/179 |
| 2005/0226588 | A1 | * | 10/2005 | Pons | 385/135 |
| 2006/0198634 | A1 | * | 9/2006 | Ofalt et al. | 398/16 |
| 2006/0236624 | A1 | * | 10/2006 | Blair | 52/220.1 |
| 2007/0014526 | A1 | * | 1/2007 | Lazo | 385/134 |
| 2007/0025676 | A1 | * | 2/2007 | Russell | 385/134 |
| 2007/0049794 | A1 | * | 3/2007 | Glassenberg et al. | 600/109 |
| 2008/0114555 | A1 | * | 5/2008 | Scott | 702/66 |
| 2008/0297773 | A1 | * | 12/2008 | Blair et al. | 356/73.1 |

* cited by examiner

*Primary Examiner* — K. Cyrus Kianni

(57) ABSTRACT

A device connects to a male network connector of a network conduit, and connects to a female network connector of the network conduit. The female network connector is capable of communicating with the male network connector. The device also measures outputs of the male network connector and the female network connector.

15 Claims, 12 Drawing Sheets

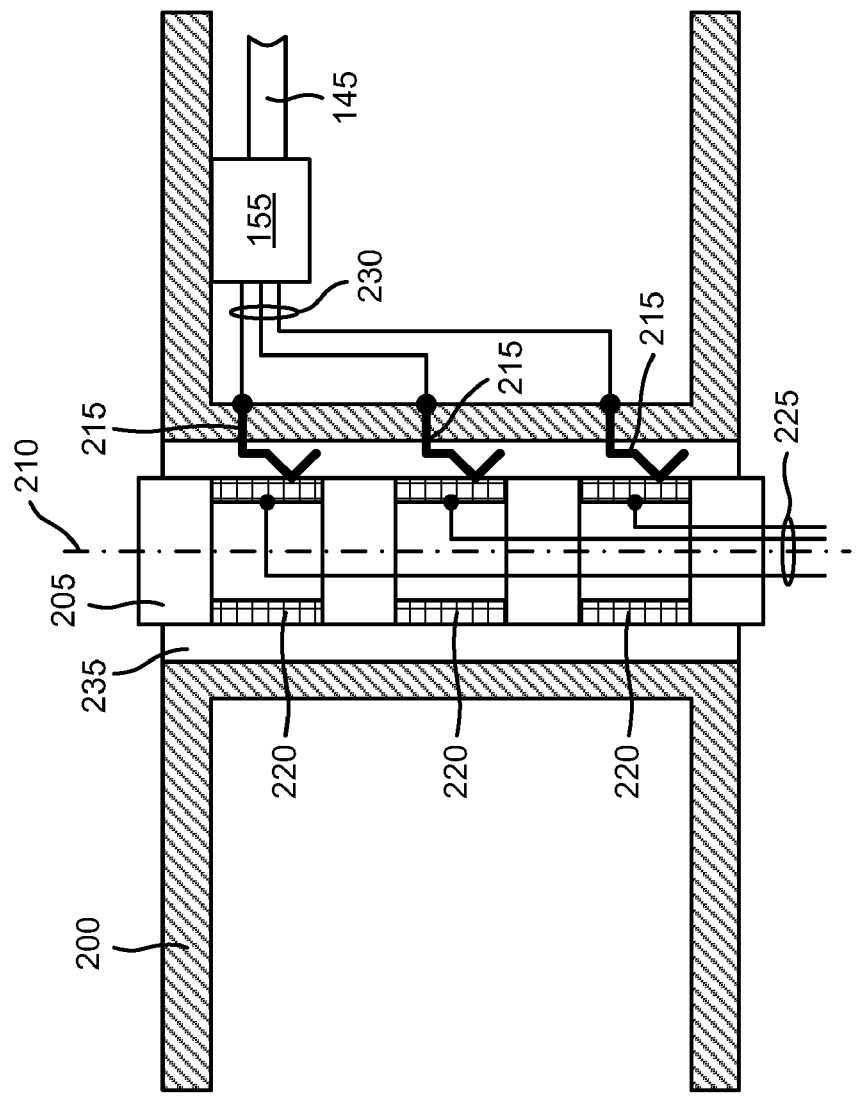

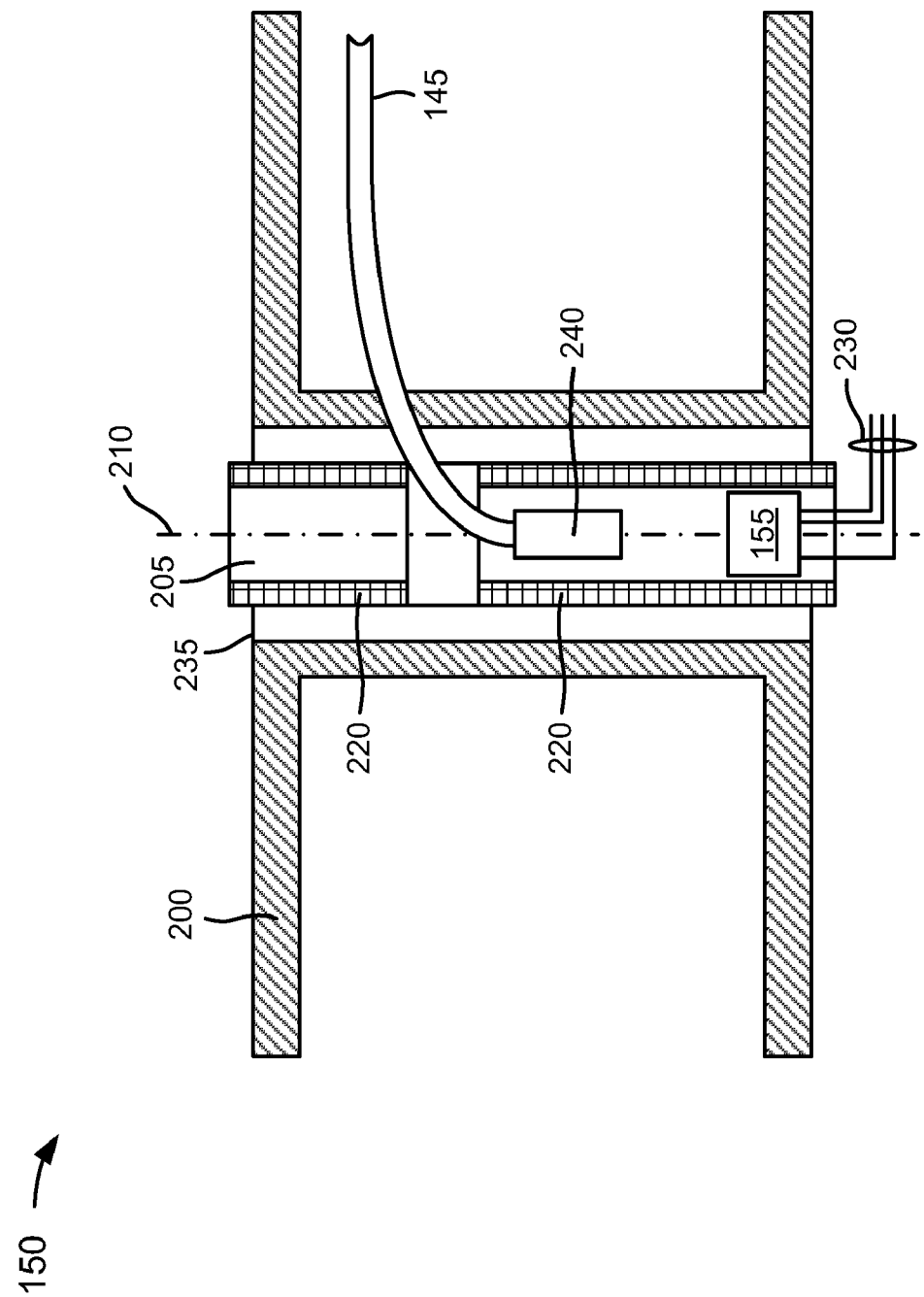

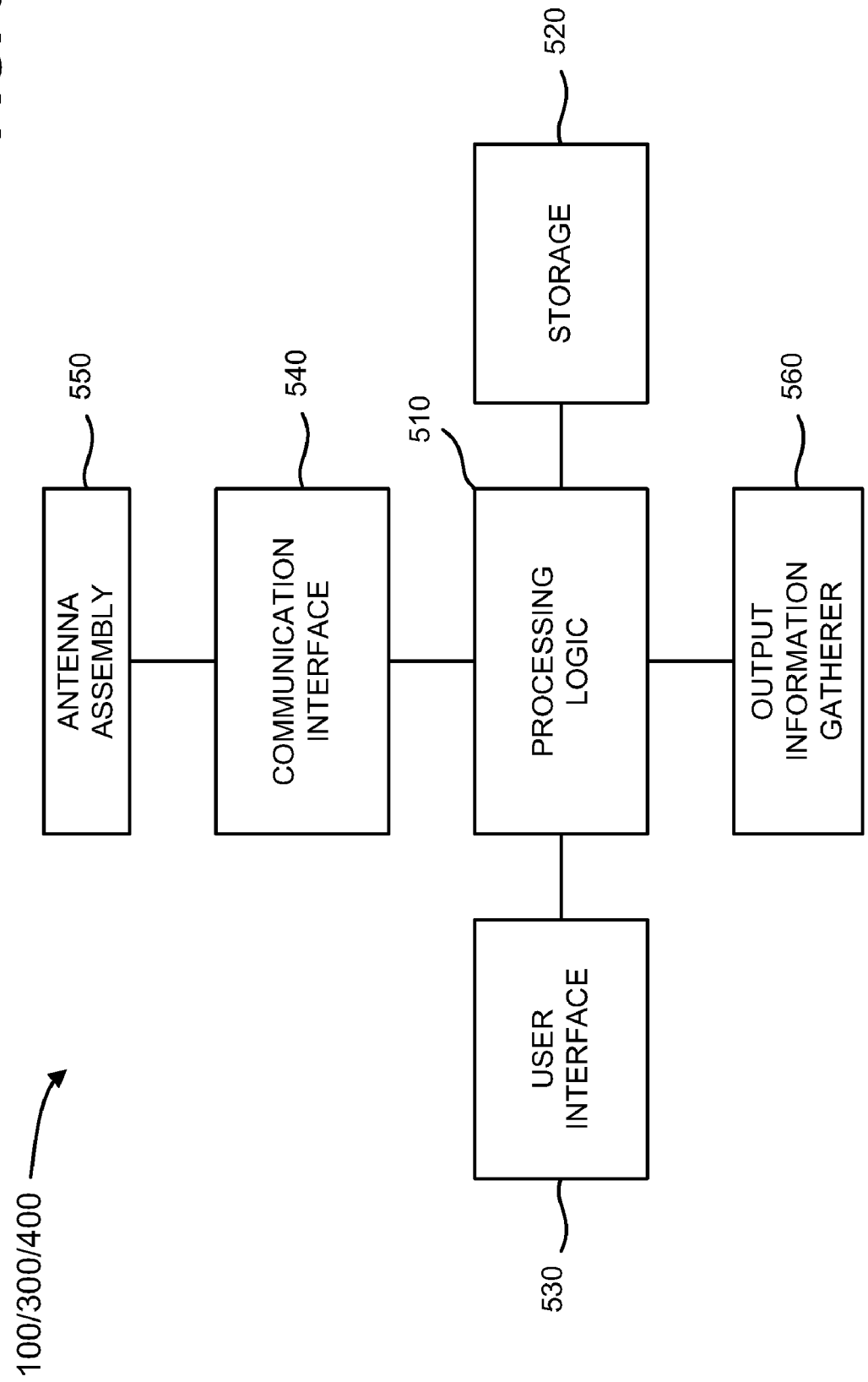

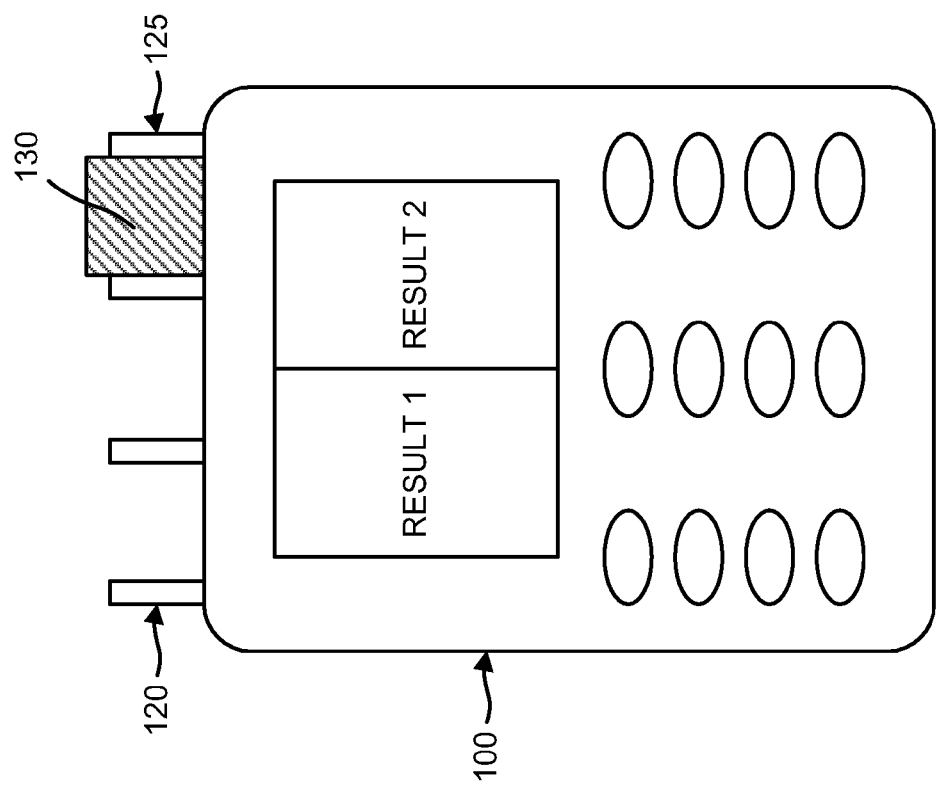
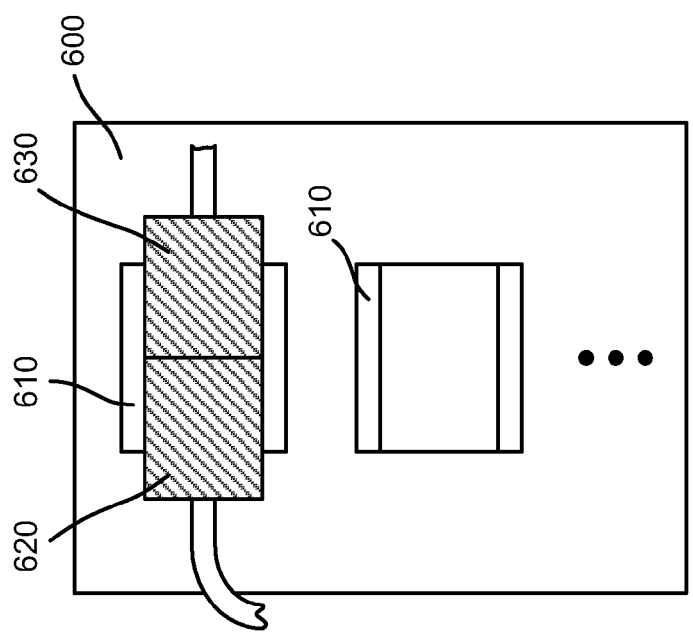
FIG. 6A

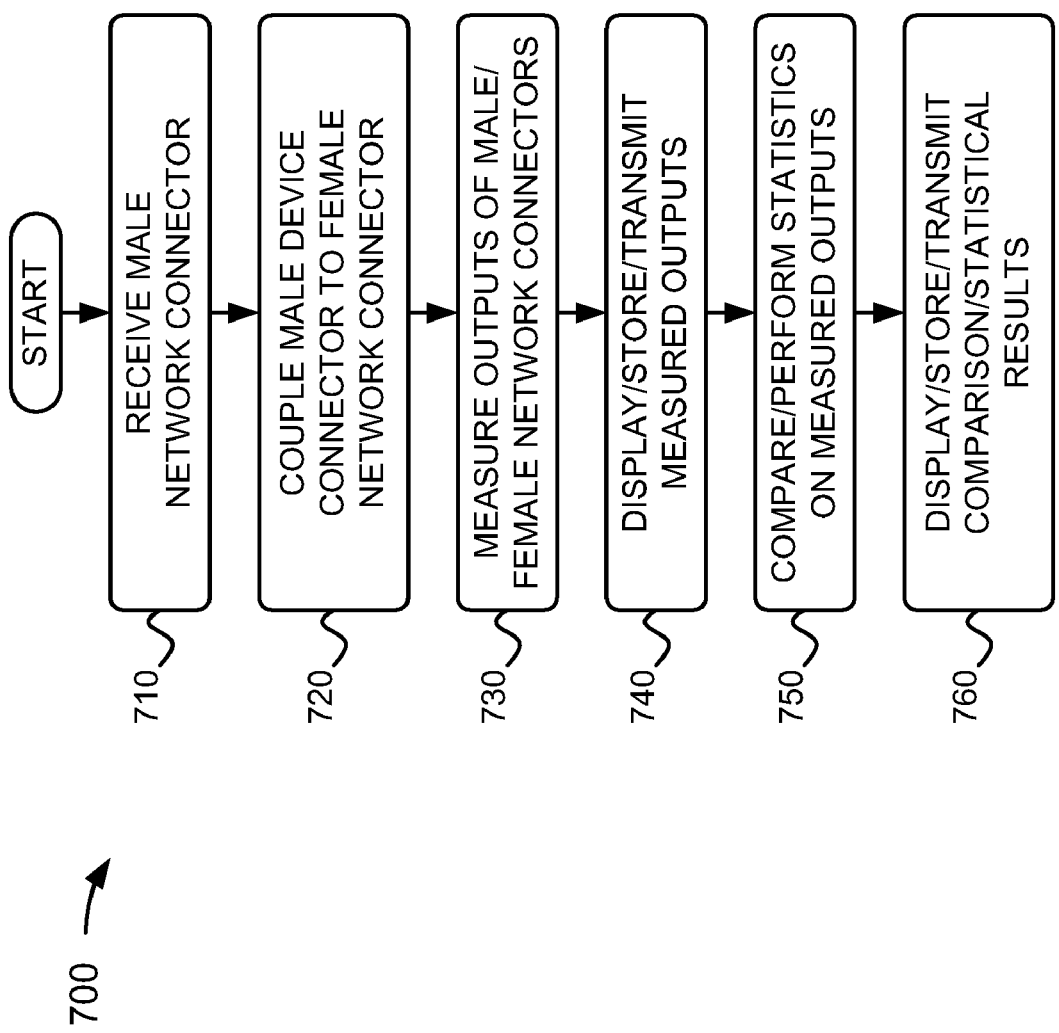

OPTICAL SIGNAL MEASUREMENT DEVICE

BACKGROUND INFORMATION

Communications networks (e.g., optical communications networks) may contain several network conduits (e.g., optical fibers) that may need to be tested on a daily basis. An output (e.g., optical power) of a network conduit may be measured by measuring a connection point of the network conduit. A connection point may include a male connector interconnected with a female connector. Technicians typically need to measure optical power in both directions of a given connection point because many times technicians cannot determine whether a direction of the connection point is a transmit direction or a receive direction. For example, the labels for the transmit direction or the receive direction may be incorrect, or there may be incorrect connectors for the connection point.

To test a connection point, the male and female connectors may be disconnected and accessed with a measurement device (e.g., an optical power meter). Most existing optical power meters only have a single female receiver head for receiving male connectors. Typically, the male connector of the network may be provided within the single female receiver head of the power meter, and the power meter may measure the optical power output to or by the male network connector.

To measure the optical power of the female network connector, a jumper that includes the same type of connector as the female network connector may need to be located. One end of the jumper may be connected to the female network connector. The other end of the jumper may be provided within the single female receiver head of the power meter, and the power meter may measure the optical power output provided to or by the female network connector.

Thus, there may be several steps involved in measuring a single connection point of a network conduit, and the procedure may be very time consuming. Many times the measured optical power output of the first measured connector (i.e., the male network connector or the female network connector) may be forgotten by a technician prior to measuring the second measured connector, requiring the technician to duplicate measurement of the first connector.

BRIEF DESCRIPTION OF THE DRAWINGS

FIGS. 2A and 2B depict exemplary pulley arrangements of the device of FIGS. 1A and 1B;

FIG. 5 is a diagram of exemplary components of the exemplary devices shown in FIGS. 1A, 1B, and 3A-4B;

FIGS. 6A and 6B depict exemplary measurement of an optical signal(s) with the exemplary device shown in FIGS. 1A and 1B; and FIG. 7 is a flowchart of an exemplary process capable of being performed by the exemplary devices shown in FIGS. 1A, 1B, and 3A-4B.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and methods described herein may provide an optical signal measurement device that includes two optical detectors for measuring two optical signals simultaneously. For example, in one implementation, a female receiver head of the optical signal measurement device may be used to measure an optical signal provided to or by a male connector of a network conduit. A male connector connected to the optical signal measurement device may be used to measure a female connector of the network conduit. The systems and methods may simplify the optical measurement procedure to a single step, which may save time, and may be used in various connection scenarios. The systems and methods also may not require the technician to remember measured values or to find a jumper, and may permit quicker identification of a transmission problem in a network conduit.

Although the systems and methods described herein relate to optical conduits, in other implementations, the systems and methods may be used in conjunction with other type of conduits. A "conduit," as the term is used herein, is to be broadly construed to include any electrical cable, optical cable, telephone cable, coaxial cable, copper conductors, or other like media used to transmit and/or receive data or information from one point to another.

The expression "optically communicates," as used herein, may refer to any connections, coupling, link, or other similar mechanism by which optical signals that may be carried by one optical component may be imparted to a communicating optical component. For example, "optically communicating" devices may not necessarily be directly connected to one another and may be separated by intermediate optical components or devices.

Figure 1A:
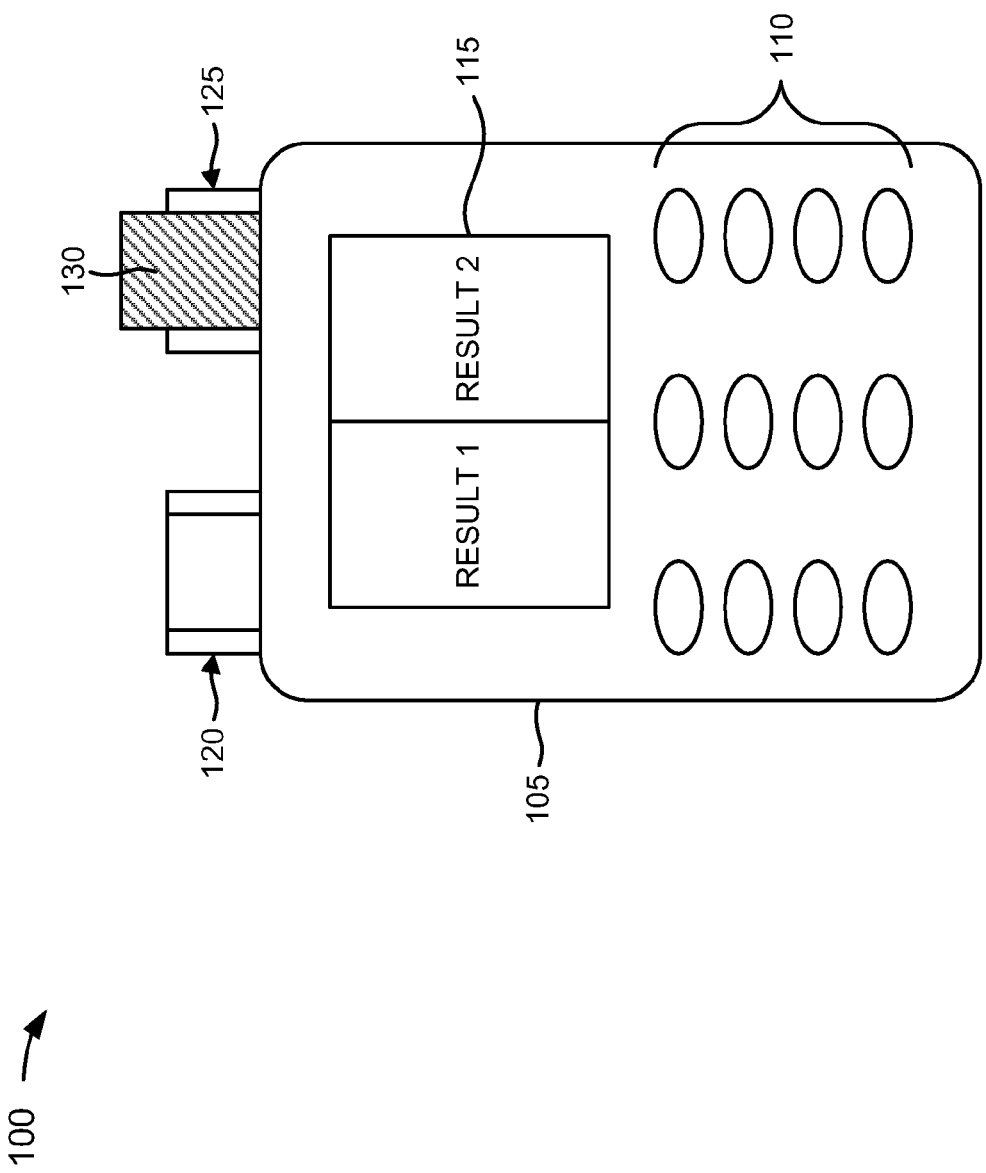
FIGS. 1A and 1B depict an exemplary device in which systems and methods described herein may be implemented.
Figure 1B:
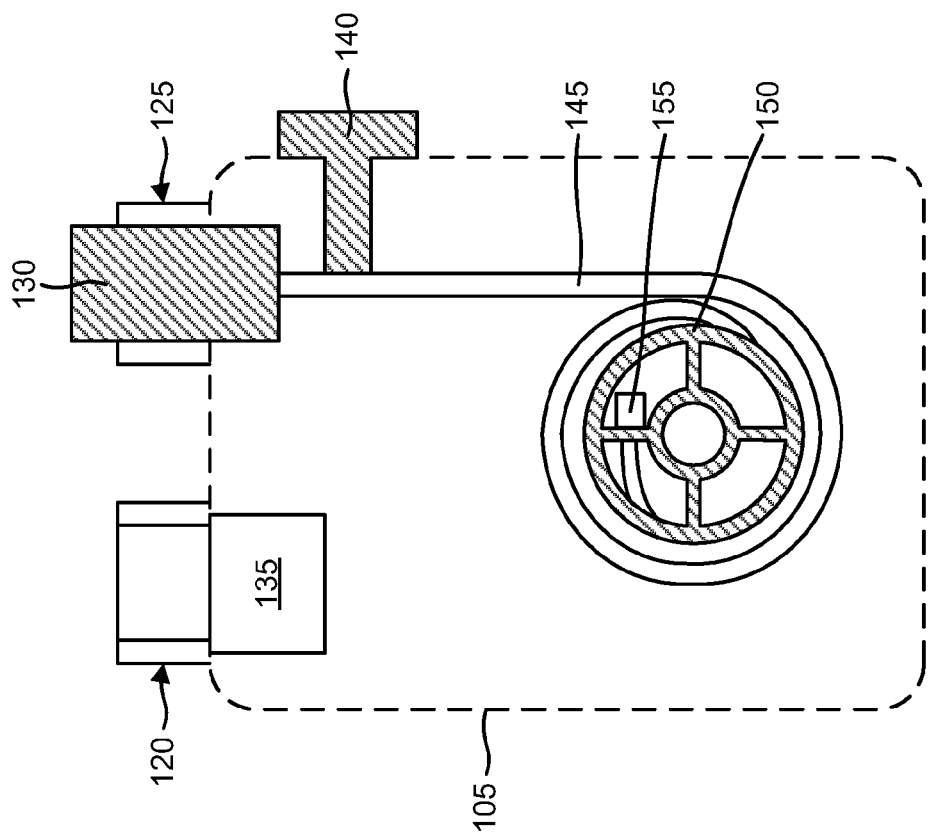

FIGS. 1A and 1B depict an exemplary device 100 in which systems and methods described herein may be implemented. FIG. 1A depicts an external front view of device 100, and FIG. 1B depicts a partial internal front view of device 100. Device 100 may include any device used to measure properties of a conduit or another type of computation or communication device, a thread or process running on one of these devices, and/or an object executable by one of these devices. For example, in one implementation, device 100 may include an optical power meter that measures a strength or power of an optical signal provided through a conduit. In other implementations, device 100 may include a photometer, a radiometer, etc.

As shown in FIG. 1A, device 100 may include a variety of components, such as a housing 105, control buttons 110, a display 115, a female receiver head 120, and/or a receiver head 125 through which a male connector 130 may extend from and/or retract into housing 105. Housing 105 may protect the components of device 100 from outside elements. Control buttons 110 may permit a user to interact with device 100 to cause device 100 to perform one or more operations. Display 115 may provide visual information to the user. For example, display 115 may provide information regarding a measurement result (e.g., "RESULT 1" or "RESULT 2") of female receiver head 120, a measurement result (e.g., "RESULT 1" or "RESULT 2") of male connector 130, etc.

Female receiver head 120 may be a point of attachment for a network conduit (not shown) and may be a point of entry for a male network connector (not shown) provided at one end of a network conduit (not shown). Female receiver head 120 may receive a variety of male network connectors. For example, female head receiver 120 may receive a male optical fiber connector (e.g., Local Connector (LC), Ferrule Connector (FC), Straight Tip (ST), Standard Connector (SC), biconic, Enterprise Systems Connection (ESCON), Fiber Connectivity (FICON), Fiber-Distributed Data Interface (FDDI), loopback, Opti-Jack, Mechanical Transfer Registered Jack (MT-RJ), D4, MTP, MU, SMA, etc. type connectors), a male electrical connector (e.g., a coaxial cable connector), etc. Female receiver head 120 may permit measurement by device 100 of an optical signal provided to or by the male network connector.

Receiver head 125 may provide an opening in housing 105 of device 100 to permit male connector 130 to extend from and/or retract into housing 105. Male connector 130 may connect to a female network connector of a network conduit (not shown) formerly connected to a male network connector (not shown). Male connector 130 may include a variety of male connectors. For example, male connector 130 may include a male optical fiber connector (e.g., Local Connector (LC), Ferrule Connector (FC), Straight Tip (ST), Standard Connector (SC), biconic, Enterprise Systems Connection (ESCON), Fiber Connectivity (FICON), Fiber-Distributed Data Interface (FDDI), loopback, Opti-Jack, Mechanical Transfer Registered Jack (MT-RJ), D4, MTP, MU, SMA, etc. type connectors), a male electrical connector (e.g., a coaxial cable connector), etc. Male connector 130 may permit measurement by device 100 of an optical signal provided to or by the female network connector.

As shown in FIG. 1B, device 100 may further include an optical detector 135 corresponding to female receiver head 120, a latch gear 140, a jumper 145 coupled to male connector 130, a pulley 150, and/or an optical detector 155 corresponding to male connector 130.

Optical detectors 135 and 155 may optically communicate with the male network connector (not shown) and the female network connector (not shown), respectively, in order to measure the power of optical signals provided to or by these network devices. Optical detectors 135 and 155 may include a variety of detectors, such as photon detectors (i.e., detectors where light energy may interact with electrons in the detectors' material and may generate free electrons), thermal detectors (i.e., detectors that may respond to heat energy delivered by light), etc. Photon detectors may further include photoconductive detectors (i.e., incoming light may produce free electrons which can carry electrical current so that the electrical conductivity of the detector material may change as a function of the intensity of the incident light), photovoltaic detectors (a voltage may be generated if optical energy strikes the device), photoemissive detectors (incident photons may release electrons from the surface of the detector material, and the free electrons may be collected in an external circuit), etc. In other implementations, optical detectors 135 and 155 may be replaced with electrical detectors, e.g., if the network devices provide electrical signals instead of optical signals.

Optical detector 135 may be coupled to female receiver head 120, and optical detector 155 may be coupled to pulley 150 and jumper 145, as shown in FIG. 1B. Optical detectors 135 and 155 may provide the measured power of the optical signals to other components of device 100. For example, in one implementation, optical detector 135 may provide the measured power of the male network connector to display 115, and display 115 may provide visual information (e.g., "RESULT 1" or "RESULT 2") indicating the measured power. Additionally or alternatively, optical detector 155 may provide the measured power of the female network connector to display 115, and display 115 may provide visual information (e.g., "RESULT 1" or "RESULT 2") indicating the measured power. In other implementations, optical detectors 135 and 155 may provide the measured power of the optical signals to processing logic of device 100, and the processing logic may compare, perform statistics on, transmit, etc. the measured power of the optical signals.

Latch gear 140 may include a mechanism that retains jumper 145 at a desired location. For example, latch gear 140 may frictionally engage jumper 145, and may prevent jumper 145 from retracting through receiver head 125. A retracting or rewinding force may be applied to jumper 145 via a spring-loaded mechanism provided in pulley 150, as described below. In other implementations, latch gear 140 may be replaced with other mechanisms capable of retaining jumper 145 at a desired location.

Jumper 145 may be coupled at one end to male connector 130, and may be coupled at another end to optical detector 155. Jumper 145 may include a conduit for communicating data or information from male connector 130 to optical detector 155. For example, in one implementation, jumper 145 may include an optical fiber that communicates optical signals received by male connector 130 to optical detector 155. In other implementations, jumper 145 may include an electrical cable that communicates electrical signals received by male connector 130 to an electrical detector.

Pulley 150 may provide a mechanism to rewind jumper 145 and/or male connector 130 if not in use. Additional details of pulley 150 are provided below in connection with FIGS. 2A and 2B.

Although FIGS. 1A and 1B show exemplary components of device 100, in other implementations, device 100 may contain fewer or additional components that may provide optical signal measurement of multiple connectors. For example, although FIGS. 1A and 1B show two optical detectors for device 100, in other implementations, device 100 may include more than two optical detectors. In still other implementations, device 100 may include additional components such as a speaker to provide audible information to a user of device 100, a microphone to receive audible information from the user, a camera to enable the user to capture and/or store video and/or images (e.g., pictures). In still further implementations, one or more components of device 100 may perform the tasks performed by other components of device 100.

FIGS. 2A and 2B depict exemplary arrangements of pulley 150 and other components of device 100. As shown in the first exemplary arrangement of FIG. 2A, pulley 150 may include a reel portion 200, a fixed shaft 205, an axis 210 of shaft 205, conductive contacts 215, conductive portions 220 surrounding shaft 205, conductive wires 225, wires 230 supplying power to optical detector 155, and/or a spring-loaded mechanism 235. As further shown in FIG. 2A, optical detector 155 may connect to reel portion 200 of pulley 150, and may optically communicate with jumper 145.

Reel portion 200 may include a mechanism (e.g., a cylinder) around which lengths of another material (e.g., jumper 145) may be wound for storage. For example, in one implementation, reel portion 200 may include a cylindrical core and walls on the sides to retain the material (e.g., jumper 145) wound around the core. The size of reel portion 200 may depend on a variety of factors. For example, reel portion 200 may be sized to fit within housing 105, may be sized to permit an entire length of jumper 145 to be stored, etc.

Reel portion 200 may rotatably connect to shaft 205, and may rotate about axis 210 of shaft 205. For example, reel portion 200 may rotate in one direction to wind jumper 145, and may rotate in an opposite direction to unwind jumper 145. Shaft 205 may be a variety of shapes and sizes, depending upon the size and shape of device 100 and/or pulley 150. For example, in one implementation, shaft 205 may be cylindrical in shape and may be sized to accommodate the desired size of the core of reel portion 200.

Conductive contacts 215 may electrically couple conductive wires 225 to optical detector 155, via conductive portions 220 and wires 230, in order to provide power to optical detector 155. For example, conductive wires 225 may provide electrical power or energy to conductive portions 220. Conductive portions 220 may transfer the power to conductive contacts 215, and conductive contacts 215 may transfer the power to optical detector 155 via wires 230. Optical detector 155 may utilize the power to energize components provided therein for measuring, e.g., optical signals provided to or by jumper 145.

Conductive contacts 215 may include conductive materials (e.g., metals, plated metals, etc.) and may form circuits when they engage conductive portions 220. Conductive contacts 215 may electrically couple to wires 230 and may provide electrical power to optical detector 155, via wires 230. Conductive portions 220 may be provided around an outer surface of fixed shaft 205, and may be made from a conductive material such as metals, plated metals, etc. Conductive portions 220 may engage conductive contacts 215 to form circuits and may be electrically coupled to wires 225 to provide electrical power from wires 225 to optical detector 155. Wires 225 and 230 may include any type of conductive material, such as metals (e.g., copper, aluminum, gold, etc.), plated metals, etc.

Spring-loaded mechanism 235 may provide a mechanism that automatically rewinds jumper 145 onto reel portion 200 of pulley 150. For example, in one implementation, spring-loaded mechanism 235 may provide a constant rotational force on reel portion 200 in a direction that may wind jumper 145 onto reel portion 200. A user of device 100 may pull jumper 145 from housing 105 to a desired length extending away from housing 150, e.g., so that a network device may be measured and/or tested via male connector 130. Latch gear 140 may retain jumper 145 at the desired length by preventing the rotational force of spring-loaded mechanism 235 from rewinding jumper 145 onto reel portion 200. If latch gear 140 disengages jumper 145, the rotational force of spring-loaded mechanism 235 may automatically rewind jumper 145 onto reel portion 200.

As shown in the second exemplary arrangement of FIG. 2B, pulley 150 may include reel portion 200, fixed shaft 205, wires 230 supplying power to optical detector 155, and/or spring-loaded mechanism 235, as described above in connection with FIG. 2A. Optical detector 155 may alternatively be provided on fixed shaft 205 rather than reel portion 200, and may be prevented from rotating. Wires 230 may alternatively be directly coupled to optical detector 155. In such an arrangement, conductive contacts 215, conductive portions 220, and conductive wires 225 may be omitted.

As further shown in FIG. 2B, one end of jumper 145 may include a collimator 240 that may optically communicate with optical detector 155. In one implementation, collimator 240 may connect to the core of reel portion 200 and may rotate with reel portion 200. Collimator 240 may optically communicate with optical detector 155 so that optical signals from jumper 145 may be measured if collimator 240 aligns with or substantially aligns with optical detector 155. For example, collimator 240 may align with optical detector 155 if jumper 145 is completely unwound from reel portion 200. In other implementations, collimator 240 may connect to fixed shaft 205 and may align with optical detector 155 on fixed shaft 205. Collimator 240 may include a device that filters a stream of light rays so that rays traveling parallel to a specified direction may be allowed through collimator 240.

Although FIGS. 2A and 2B show exemplary components of pulley 150, in other implementations, pulley 150 may contain fewer or additional components that may aid in storing jumper 145 and/or measuring optical signals from jumper 145. In still other implementations, one or more components of pulley 150 may perform the tasks performed by other components of device 150.

Figure 3A:
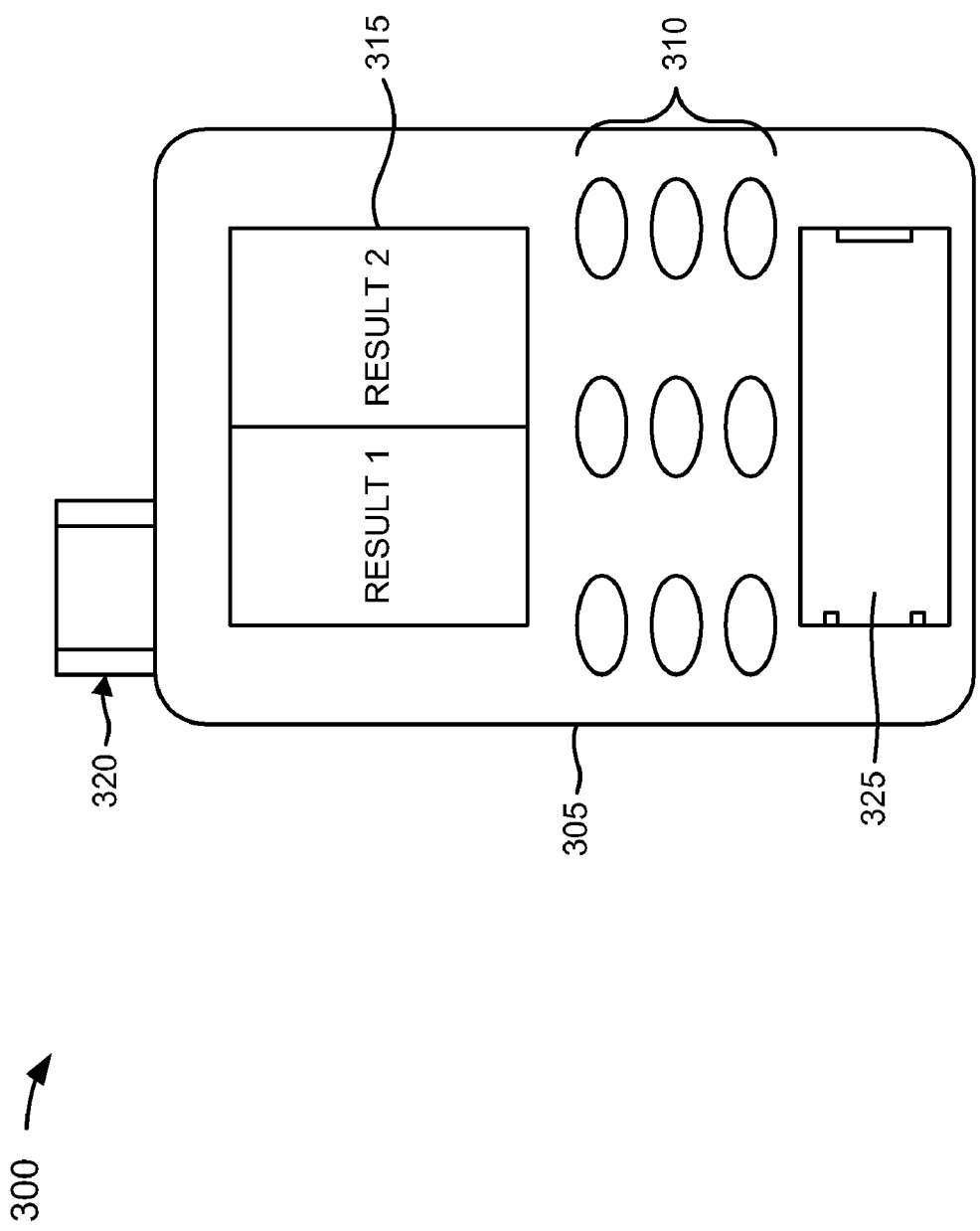
FIGS. 3A and 3B depict another exemplary device in which systems and methods described herein may be implemented.
Figure 3B:
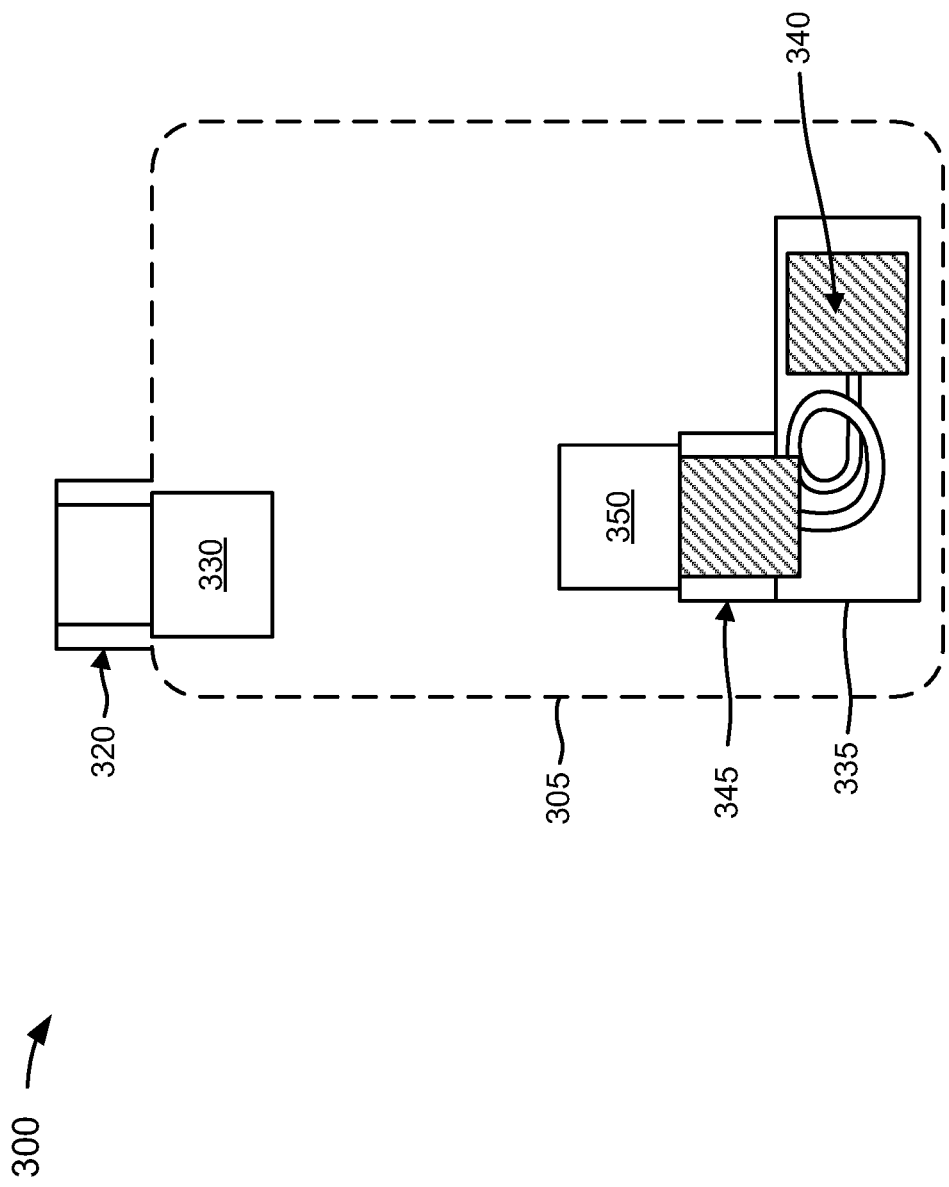

FIGS. 3A and 3B depict another exemplary device 300 in which systems and methods described herein may be implemented. FIG. 3A depicts an external front view of device 300, and FIG. 3B depicts a partial internal front view of device 300. Device 300 may include any device used to measure properties of a conduit or another type of computation or communication device, a thread or process running on one of these devices, and/or an object executable by one of these devices. For example, in one implementation, device 300 may include an optical power meter that measures a strength or power of an optical signal provided through a conduit. In other implementations, device 300 may include a photometer, a radiometer, etc.

As shown in FIG. 3A, device 300 may include a variety of components, such as a housing 305, control buttons 310, a display 315, a female receiver head 320, and/or a storage compartment 325. Housing 305 may protect the components of device 300 from outside elements. Control buttons 310 may permit a user to interact with device 300 to cause device 300 to perform one or more operations. Display 315 may provide visual information to the user. For example, display 315 may provide information regarding a measurement result (e.g., "RESULT 1" or "RESULT 2") of female receiver head 320, a measurement result (e.g., "RESULT 1" or "RESULT 2") of a jumper stored in storage compartment 325, etc.

Female receiver head 320 may be a point of attachment for a network conduit (not shown) and may be a point of entry for a male network connector (not shown) provided at one end of the network conduit. Female receiver head 320 may permit measurement by device 300 of an optical signal provided to or by the network conduit. In one implementation, for example, female receiver head 320 may function in a similar manner as female receiver head 120 of device 100, and may contain similar components and/or features as female receiver head 120 of device 100.

Storage compartment 325 may provide storage for a jumper and corresponding connectors (not shown). Although FIG. 3A shows storage compartment 325 as including a hinged cover (e.g., similar to a battery storage compartment), in other implementations, storage compartment 325 may include other types of covers (e.g., a sliding cover, etc.).

As shown in FIG. 3B, device 300 may further include an optical detector 330 corresponding to female receiver head 320, an opening 335 of storage compartment 325, a jumper 340 coupled to a male connector on one end and a male or a female connector on another end, a receiver head 345 for receiving the male/female connector of jumper 340, and/or an optical detector 350 corresponding to the male/female connector of jumper 340.

Optical detectors 330 and 350 may optically communicate with the male network connector (not shown) and the female network connector (not shown), respectively, in order to measure the power of optical signals provided to or by these network devices. Optical detector 330 may be coupled to female receiver head 320, and optical detector 350 may be coupled to the male/female connector of jumper 340 via receiver head 345. Optical detector 350 may optically communicate with the female network connector (not shown) via optical communication with the male connector of jumper 340, jumper 340, and the male/female connector of jumper 340. In one implementation, for example, optical detectors 330 and 350 may function in a similar manner as optical detectors 135 and 155 of device 100, and may contain similar components and/or features as optical detectors 135 and 155 of device 100.

Opening 335 of storage compartment 325 may be sized and shaped to accommodate the desired length of jumper 340. For example, opening 335 may be large enough to accommodate a jumper having a length that may extend to and/or measure an optical signal provided to or by the female network connector.

The male connector of jumper 340 may connect to a female network connector (not shown) formerly connected to a male network connector (not shown) provided at one end of a network conduit. The male connector of jumper 340 may permit measurement by device 300 of an optical signal provided to or by the female network connector. In one implementation, for example, the male connector of jumper 340 may function in a similar manner as male connector 130 of device 100, and may contain similar components and/or features as male connector 130 of device 100.

The female/male connector of jumper 340 may couple jumper 340 to optical detector 350, and may permit optical communication between the female network connector and optical detector 350.

Jumper 340 may include a conduit for communicating data or information from its male connector to optical detector 350. In one implementation, for example, jumper 340 may function in a similar manner as jumper 145 of device 100, and may contain similar components and/or features as jumper 145 of device 100.

Although FIGS. 3A and 3B show exemplary components of device 300, in other implementations, device 300 may contain fewer or additional components that may provide optical signal measurement of multiple connectors. For example, although FIGS. 3A and 3B show two optical detectors for device 300, in other implementations, device 300 may include more than two optical detectors. In still other implementations, device 300 may include additional components such as a speaker to provide audible information to a user of device 300, a microphone to receive audible information from the user, a camera to enable the user to capture and/or store video and/or images (e.g., pictures). In still further implementations, one or more components of device 300 may perform the tasks performed by other components of device 300.

Figure 4A:
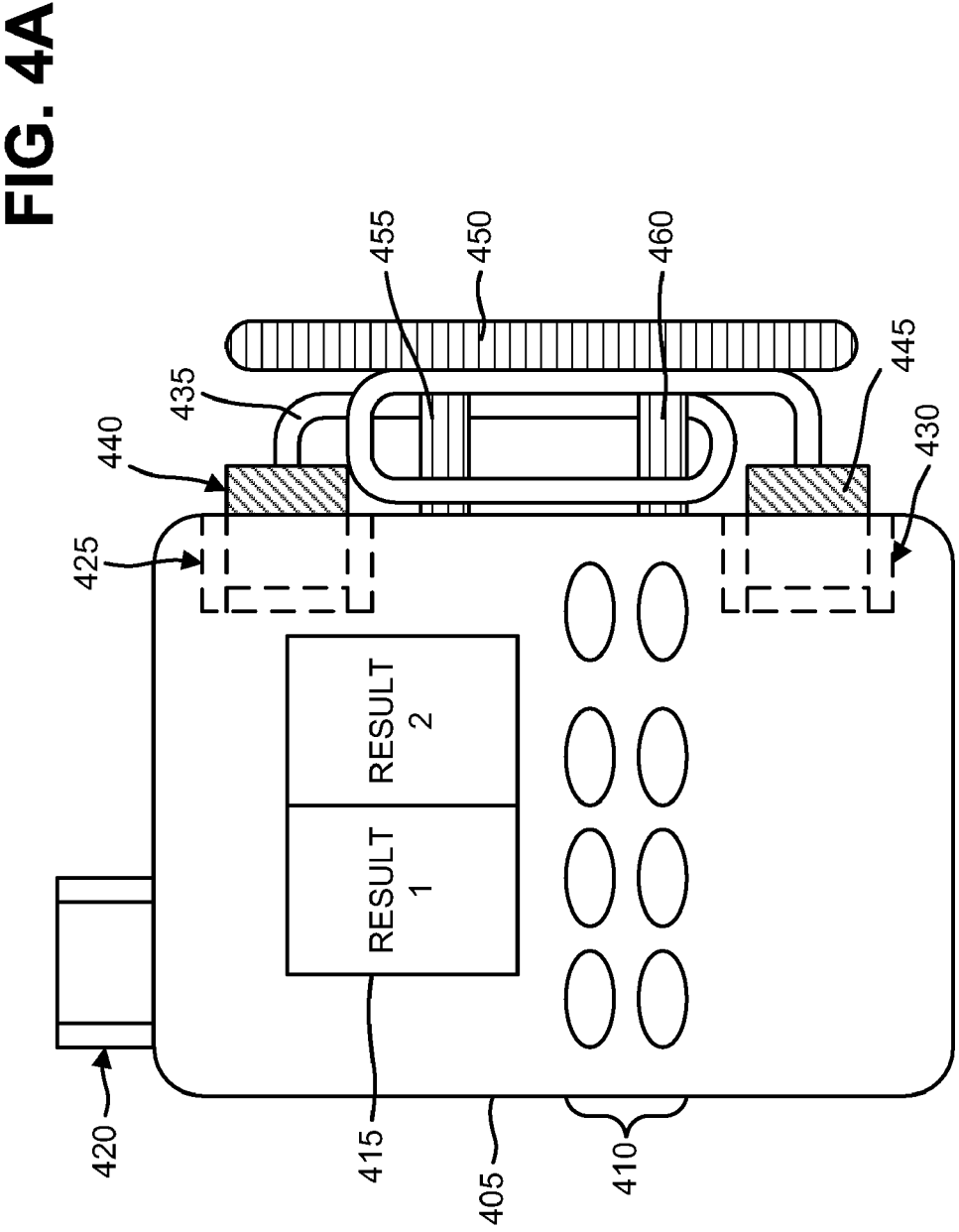
FIGS. 4A and 4B depict still another exemplary device in which systems and methods described herein may be implemented.
Figure 4B:
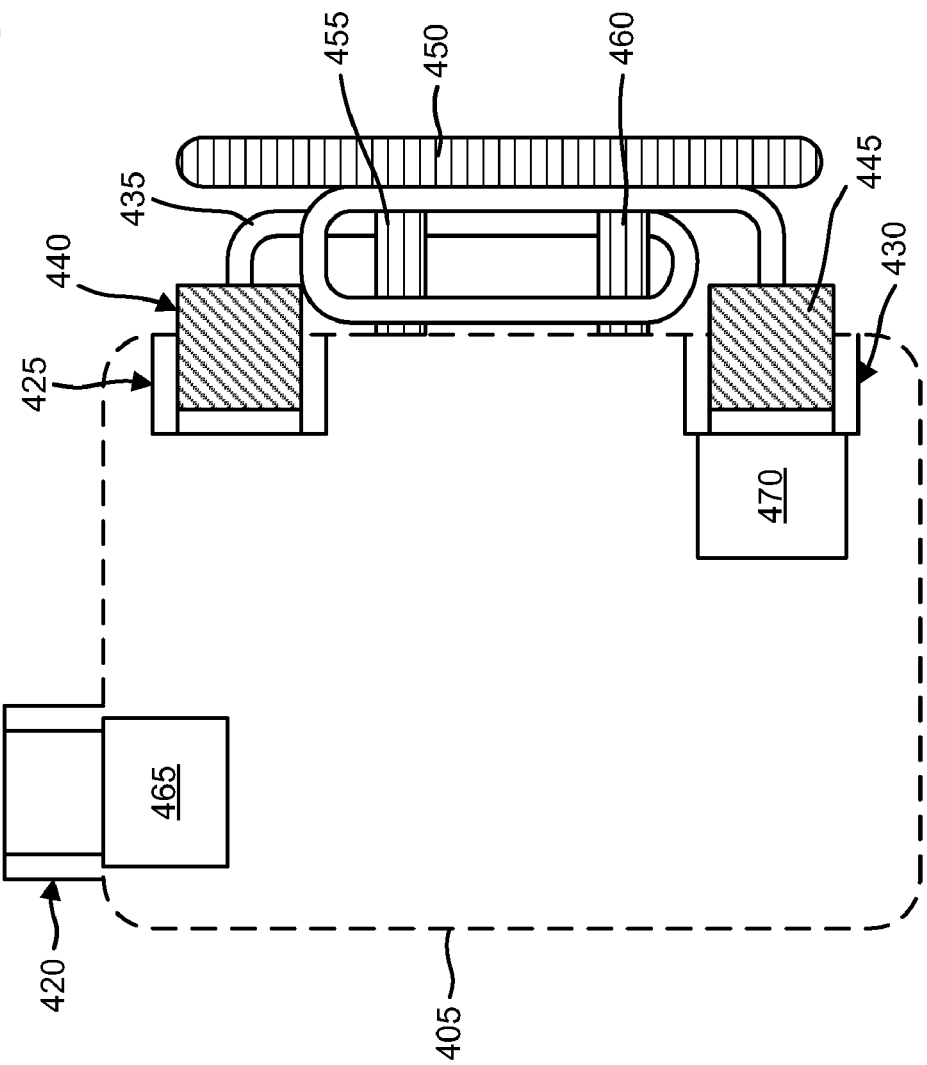

FIGS. 4A and 4B depict still another exemplary device 400 in which systems and methods described herein may be implemented. FIG. 4A depicts an external front view of device 400, and FIG. 4B depicts a partial internal front view of device 400. Device 400 may include any device used to measure properties of a conduit or another type of computation or communication device, a thread or process running on one of these devices, and/or an object executable by one of these devices. For example, in one implementation, device 400 may include an optical power meter that measures a strength or power of an optical signal provided through a conduit. In other implementations, device 400 may include a photometer, a radiometer, etc.

As shown in FIG. 4A, device 400 may include a variety of components, such as a housing 405, control buttons 410, a display 415, a female receiver head 420, a receiver head 425, a receiver head 430, a jumper 435 coupled to a male connector 440 on one end and a male or a female connector 445 on another end, and/or a handle 450 that may connect to housing 405 via arms 455 and 460. As shown in FIG. 4B, device 400 may further include an optical detector 465 corresponding to female receiver head 420, and/or an optical detector 470 corresponding to male/female connector 445 of jumper 435.

Housing 405 may protect the components of device 400 from outside elements. Control buttons 410 may permit a user to interact with device 400 to cause device 400 to perform one or more operations. Display 415 may provide visual information to the user. For example, display 415 may provide information regarding a measurement result (e.g., "RESULT 1" or "RESULT 2") of female receiver head 420, a measurement result (e.g., "RESULT 1" or "RESULT 2") of male connector 440 of jumper 435, etc.

Female receiver head 420 may be a point of attachment for a network conduit (not shown) and may be a point of entry for a male network connector (not shown) provided at one end of the network conduit. Female receiver head 420 may permit measurement by device 400 of an optical signal provided to or by the network conduit. In one implementation, for example, female receiver head 420 may function in a similar manner as female receiver head 120 of device 100, and may contain similar components and/or features as female receiver head 120 of device 100.

Receiver head 425 may provide an opening in housing 405 of device 400 to store male connector 440 of jumper 435 if not in use. Receiver head 430 may provide an opening in housing 405 of device 400 to store male/female connector 445 of jumper 435 if not in use. Receiver head 430 may also couple optical detector 470 to male/female connector 445 of jumper 435.

Jumper 435 may include a conduit for communicating data or information from male connector 440 to optical detector 470. In one implementation, for example, jumper 435 may function in a similar manner as jumper 145 of device 100, and may contain similar components and/or features as jumper 145 of device 100.

Male connector 440 of jumper 435 may connect to a female network connector (not shown) formerly connected to a male network connector (not shown) provided at one end of a network conduit. Male connector 440 may permit measurement by device 400 of an optical signal provided to or by the female network connector. In one implementation, for example, male connector 440 may function in a similar manner as male connector 130 of device 100, and may contain similar components and/or features as male connector 130 of device 100.

Female/male connector 445 may couple jumper 435 to optical detector 470, and may permit optical communication between the female network connector and optical detector 470 via male connector 440 and jumper 435.

Optical detectors 465 and 470 may optically communicate with the male network connector (not shown) and the female network connector (not shown), respectively, in order to measure the power of optical signals provided to or by these network devices. Optical detector 465 may be coupled to female receiver head 420, and optical detector 470 may be coupled to male/female connector 445 of jumper 435 via receiver head 430. Optical detector 470 may optically communicate with the female network connector (not shown) via optical communication with male connector 440 of jumper 435, jumper 435, and male/female connector 445 of jumper 435. In one implementation, for example, optical detectors 465 and 470 may function in a similar manner as optical detectors 135 and 155 of device 100, and may contain similar components and/or features as optical detectors 135 and 155 of device 100.

Handle 450 may be sized and shaped to accommodate the desired length of jumper 435. For example, handle 450 may be sized to accommodate a jumper having a length that may extend to and/or measure an optical signal provided to or by the female network connector. As shown in FIGS. 4A and 4B, arms 455 and 460 may extend away from and connect handle 450 to housing 405. In one implementation, the lengths of arms 455 and 460 may sized to accommodate a jumper having a length that may extend to and/or measure an optical signal provided to or by the female network connector.

Although FIGS. 4A and 4B show exemplary components of device 400, in other implementations, device 400 may contain fewer or additional components that may provide optical signal measurement of multiple connectors. For example, although FIGS. 4A and 4B show two optical detectors for device 400, in other implementations, device 400 may include more than two optical detectors. In still other implementations, device 400 may include additional components such as a speaker to provide audible information to a user of device 400, a microphone to receive audible information from the user, a camera to enable the user to capture and/or store video and/or images (e.g., pictures). In still further implementations, one or more components of device 400 may perform the tasks performed by other components of device 400.

FIG. 5 is a diagram of exemplary components of devices 100/300/400. As shown in FIG. 5, devices 100/300/400 may include processing logic 510, storage 520, a user interface 530, a communication interface 540, an antenna assembly 550, and an output information gatherer 560. Processing logic 510 may include a processor, a microprocessor, an application specific integrated circuit (ASIC), a field programmable gate array (FPGA), or the like. Storage 520 may include a random access memory (RAM), a read only memory (ROM), and/or another type of memory to store data and instructions that may be used by processing logic 510 to control operation of devices 100/300/400 and their components.

User interface 530 may include mechanisms for inputting information to devices 100/300/400 and/or for outputting information from devices 100/300/400. Examples of input and output mechanisms might include buttons (e.g., a joystick, control buttons 110/310/410 and/or keys of a keypad) to permit data and control commands to be input into devices 100/300/400, a display (e.g., displays 115/315/415) to output visual information (e.g., information regarding measured optical signals), and/or optical detectors (e.g., optical detectors 135/155/330/350/465/470) to output measured optical signals.

Communication interface 540 may include, for example, a transmitter that may convert baseband signals from processing logic 510 to radio frequency (RF) signals and/or a receiver that may convert RF signals to baseband signals. Alternatively, communication interface 540 may include a transceiver to perform functions of both a transmitter and a receiver. Communication interface 540 may connect to antenna assembly 550 for transmission and reception of the RF signals. In one implementation, for example, communication interface 540 may communicate with a network (e.g., a local area network (LAN), a wide area network (WAN), a telephone network, such as the Public Switched Telephone Network (PSTN), an intranet, the Internet, or a combination of networks) or a network component (e.g., a personal computer, a laptop, or another type of computation or communication device) to provide measured optical signals (e.g., to a database).

Output information gatherer 560 may obtain output information from devices 100/300/400. In one implementation, the output information may correspond to measured optical signals stored on devices 100/300/400 or received by devices 100/300/400. In this case, output information gatherer 560 may include a media storage device (e.g., storage 520), or a communication device (e.g., communication interface 540) capable of receiving output information from another source (e.g., wired or wireless communication with an external media storage device). In another implementation, the output information may correspond to output captured or retrieved by devices 100/300/400. In this case, output information gatherer 560 may include optical detectors (e.g., optical detectors 135/155/330/350/465/470) that may record measured optical signals. The captured output information may or may not be stored in a media storage device (e.g., storage 520).

As will be described in detail below, devices 100/300/400 described herein may perform certain operations relating to optical signal measurement. Devices 100/300/400 may perform these operations in response to processing logic 510 executing software instructions of an application contained in a computer-readable medium, such as storage 520. A computer-readable medium may be defined as a physical or logical memory device and/or carrier wave.

The software instructions may be read into storage 520 from another computer-readable medium or from another device via communication interface 540. The software instructions contained in storage 520 may cause processing logic 510 to perform processes described above and/or below. Alternatively, hardwired circuitry may be used in place of or in combination with software instructions to implement processes described herein. Thus, implementations described herein are not limited to any specific combination of hardware circuitry and software.

Although FIG. 5 shows exemplary components of devices 100/300/400, in other implementations, devices 100/300/400 may contain fewer or additional components than depicted in FIG. 5. For example, in one implementation, antenna assembly 550 may include one or more antennas to transmit and receive RF signals over the air. Antenna assembly 550 may receive RF signals from communication interface 540 and may transmit them over the air, and may receive RF signals over the air and may provide them to communication interface 540. In still other implementations, one or more components of devices 100/300/400 depicted in FIG. 5 may perform the tasks performed by other components of devices 100/300/400.

Figure 6B:
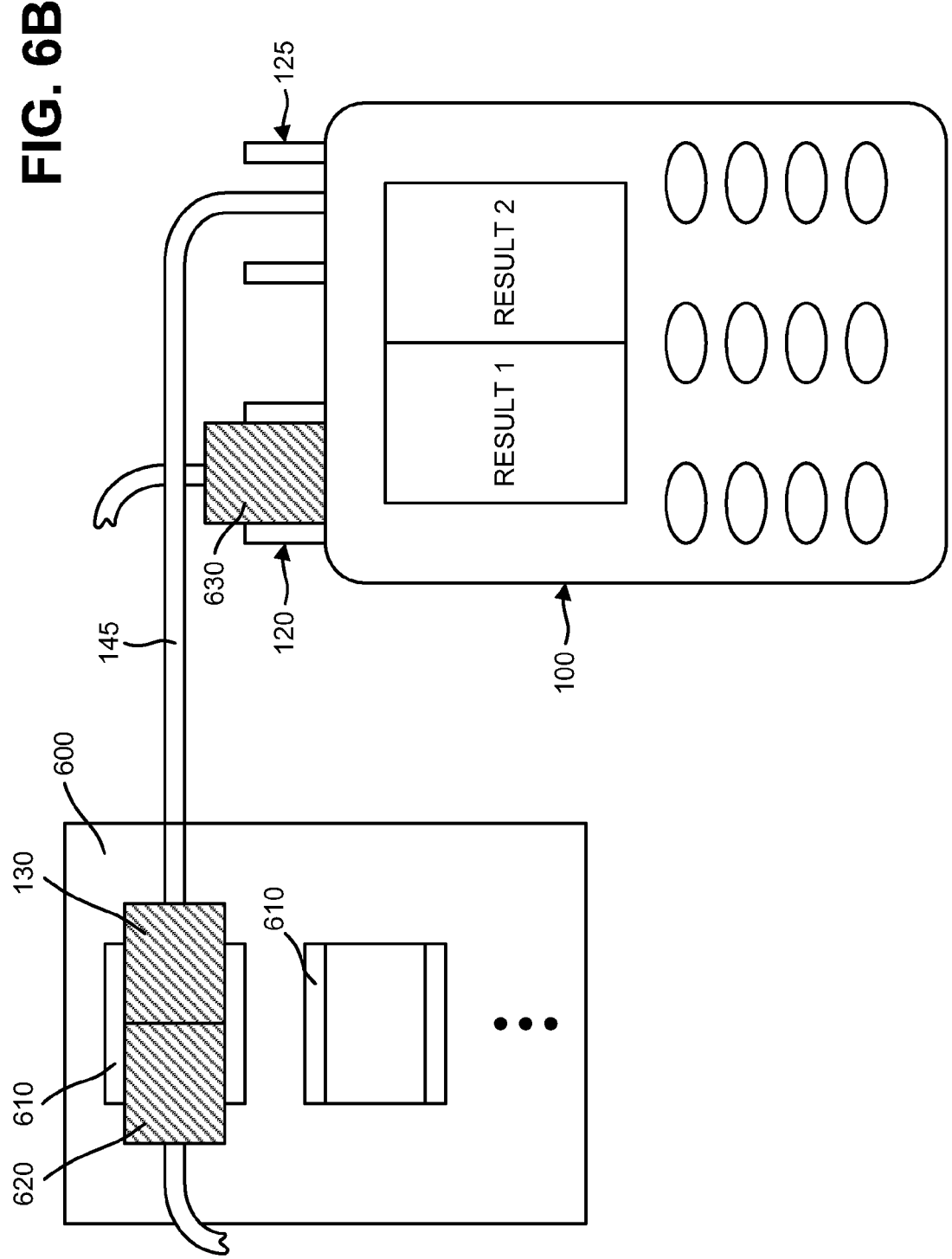

FIGS. 6A and 6B depict exemplary measurement of an optical signal(s) with device 100, although devices 300 and 400 may also be used in the exemplary measurement. As shown in FIG. 6A, a network device (e.g., an optical patch panel 600) may include adaptors 610, a female network connector 620, and/or a male network connector 630. A single adaptor 610 may couple female network connector 620 to male network connector 630 so that the connectors may optically communicate with each other. Although optical patch panel 600 shows a single female network connector and a single male network connector, in other implementations, panel 600 may include more female and male network connectors.

In order to measure an optical signal(s) from female network connector 620 and/or male network connector 630 with device 100, male network connector 630 may be disconnected from adaptor 610 and may be provided within female receiver head 120 of device, as shown in FIG. 6B. Male connector 130 of jumper 145 may be extended away from device 100 and may be provided within adaptor 610 at the location vacated by male network connector 630. At this point female network connector 620 and male network connector 630 may optically communicate with device 100, and may be ready for measurement.

A user may select a measurement to perform (e.g., via control buttons 110), and device 100 may perform optical signal measurements of female network connector 620 and/or male network connector 630. For example, in one implementation, optical detector 135 of device 100 may provide the measured power of male network connector 630 to display 115, and display 115 may provide visual information (e.g., "RESULT 1" or "RESULT 2") indicating the measured power. In other implementations, optical detector 155 of device 100 may provide the measured power of female network connector 620 to display 115, and display 115 may provide visual information (e.g., "RESULT 1" or "RESULT 2") indicating the measured power. In still other implementations, optical detectors 135 and 155 may provide the measured power of the optical signals to processing logic of device 100 (e.g., processing logic 510), and the processing logic may compare, perform statistics on, transmit (e.g., via communication interface 540 to a database external to device 100), etc. the measured power of the optical signals. The comparison or statistical results may be displayed, stored, and/or transmitted by device 100.

For example, in one exemplary implementation, device 100 may compare the measured power of female network connector 620 to the measured power of male network connector 630 to determine which connector (or if both connectors) are the source of a signaling problem in the network. A variety of statistics may be performed on the measured powers. For example, the measured powers may be statistically compared to powers measured at other connection points of the network, or may be statistically compared to previously measured powers at the same connection point of the network (e.g., this may help calculate signal degradation over time).

If the measurement is complete, male connector 130 of jumper 145 may be removed from adaptor 610 and may be automatically retracted into device 100 (e.g., via spring-loaded mechanism 235). Male network connector 630 may be returned to adaptor 610 to optically communicate with female network connector 620.

Such an arrangement may measure two optical signals (e.g., one from female network connector 620 and one from male network connector 630) simultaneously. This may simplify the optical measurement procedure to a single step, which may save time and money. Such an arrangement also may not require the technician to remember measured values or to find a jumper, and may permit quicker identification of a transmission problem in the network.

FIG. 7 depicts a flowchart of an exemplary process 700 capable of being performed by devices 100/300/400. The process of FIG. 7 may be located within devices 100/300/400 (e.g., within storage 520) and/or may be accessible by devices 100/300/400. As shown, process 700 may receive a male network connector with a measurement device (block 710). For example, in one implementation described above in connection with FIGS. 6A and 6B, in order to measure an optical signal(s) from male network connector 630 with device 100, male network connector 630 may be disconnected from adaptor 610 and may be provided within female receiver head 120 of device 100.

Process 700 may couple a male connector of the measurement device to a female network connector (block 720). For example, in one implementation described above in connection with FIGS. 6A and 6B, in order to measure an optical signal(s) from female network connector 620, male connector 130 of jumper 145 may be extended away from device 100 and may be provided within adaptor 610 at the location vacated by male network connector 630. At this point, female network connector 620 and male network connector 630 may optically communicate with device 100, and may be ready for measurement.

As further shown in FIG. 7, process 700 may simultaneously measure outputs of the male network connector and the female network connector (block 730). For example, in one implementation described above in connection with FIGS. 6A and 6B, a user may select a measurement to perform (e.g., via control buttons 110), and device 100 may perform optical signal measurements of female network connector 620 and/or male network connector 630.

Process 700 may display, store, and/or transmit the measured outputs (block 740). For example, in one implementation described above in connection with FIGS. 6A and 6B, optical detector 135 of device 100 may provide the measured power of male network connector 630 to display 115, and display 115 may provide visual information (e.g., "RESULT 1" or "RESULT 2") indicating the measured power. Optical detector 155 of device 100 may provide the measured power of female network connector 620 to display 115, and display 115 may provide visual information (e.g., "RESULT 1" or "RESULT 2") indicating the measured power.

As further shown in FIG. 7, process 700 may compare and/or perform statistics on the measured outputs (block 750). For example, in one implementation described above in connection with FIGS. 6A and 6B, optical detectors 135 and 155 may provide the measured power of the optical signals to processing logic of device 100 (e.g., processing logic 510), and the processing logic may compare, perform statistics on, transmit (e.g., via communication interface 540 to a database external to device 100), etc. the measured power of the optical signals.

Process 700 may display, store, and/or transmit the comparison and/or statistical results (block 760). For example, in one implementation described above in connection with FIGS. 6A and 6B, the comparison or statistical results may be displayed, stored, and/or transmitted by device 100.

Systems and methods described herein may provide an optical signal measurement device that includes two optical detectors for measuring two optical signals simultaneously. For example, in one implementation, a female receiver head of the optical signal measurement device may be used to measure an optical signal provided to or by a male connector of a network conduit. A male connector connected to the optical signal measurement device may be used to measure a female connector of the network conduit. The systems and methods may simplify the optical measurement procedure to a single step, which may save time. The systems and methods also may not require the technician to remember measured values or to find a jumper, and may permit quicker identification of a transmission problem in a network conduit.

The foregoing description provides illustration and description, but is not intended to be exhaustive or to limit the embodiments to the precise form disclosed. Modifications and variations are possible in light of the above teachings or may be acquired from practice of the invention.

For example, while a series of acts has been described with regard to the flowchart of FIG. 7, the order of the acts may differ in other implementations consistent with the embodiments described herein. Further, non-dependent acts may be performed in parallel. In other implementations, the receiver heads exposed outside the housings of devices described herein may be provided with covers or caps to keep them clean if not in use. In still other implementations, the devices described herein may include a variety of connector interfaces that may communicate with a variety of connector types (e.g., LC, FC, ST, SC, biconic, ESCON, FICON, FDDI, loopback, Opti-Jack, MT-RJ, D4, MTP, MU, SMA, etc. type connectors).

Embodiments, as described above, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code--it being understood that one would be able to design software and control hardware to implement the embodiments based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device comprising:
   a female receiver head capable of receiving a male network connector of a network conduit;
   a first optical detector capable of optically communicating with the male network connector, via the female receiver head, for measuring an output of the male network connector;
   a jumper conduit including a male connector capable of connecting to a female network connector of the network conduit;
   a second optical detector capable of optically communicating with the female network connector, via the jumper conduit and the male connector of the jumper conduit, for measuring an output of the female network connector; and
   a mechanism for storing the jumper conduit and the male connector of the jumper conduit, where the storage mechanism includes a pulley for automatically rewinding and storing the jumper conduit within the device.

2. The device of claim 1, where the device comprises an optical power meter.

3. The device of claim 1, where the female receiver head is capable of receiving at least one of:
   a Local Connector (LC) male network connector;
   a Ferrule Connector (FC) male network connector;
   a Straight Tip (ST) male network connector;
   a Standard Connector (SC) male network connector;
   a biconic male network connector;
   an Enterprise Systems Connection (ESCON) male network connector;
   a Fiber Connectivity (FICON) male network connector;
   a Fiber-Distributed Data Interface (FDDI) male network connector;
   a loopback male network connector;
   an Opti-Jack male network connector;
   a Mechanical Transfer Registered Jack (MT-RJ) male network connector;
   a D4 male network connector;
   a MTP male network connector;
   a MU male network connector; or
   a SMA male network connector.

4. The device of claim 1, where the first and second optical detectors comprise at least one of:
   photon detectors;
   thermal detectors;
   photoconductive detectors;
   photovoltaic detectors; or
   photoemissive detectors.

5. The device of claim 1, where the male connector of the jumper conduit is capable of connecting to at least one of:
   a Local Connector (LC) female network connector;
   a Ferrule Connector (FC) female network connector;
   a Straight Tip (ST) female network connector;
   a Standard Connector (SC) female network connector;
   a biconic female network connector;
   an Enterprise Systems Connection (ESCON) female network connector;
   a Fiber Connectivity (FICON) female network connector;
   a Fiber-Distributed Data Interface (FDDI) female network connector;
   a loopback female network connector;
   an Opti-Jack female network connector;
   a Mechanical Transfer Registered Jack (MT-RJ) female network connector;
   a D4 female network connector;
   a MTP female network connector;
   a MU female network connector; or
   a SMA female network connector.

6. The device of claim 1, further comprising:
   a latch gear for retaining the jumper conduit at a desired unwound position and preventing the pulley from automatically rewinding the jumper conduit.

7. The device of claim 1, where the pulley comprises:
   a fixed shaft;
   a reel portion rotatably connected to the fixed shaft; and
   a spring-loaded mechanism connected to the reel portion and applying a rewinding force to the jumper conduit.

8. The device of claim 7, where the second optical detector connects to the reel portion of the pulley.

9. The device of claim 8, further comprising:
   conductive contacts connected to conductive portions of the fixed shaft and providing electrical power to the second optical detector.

10. The device of claim 7, where the second optical detector connects to the fixed shaft of the pulley, and the pulley further comprises:
    a collimator connected to the reel portion of the pulley and to an end of jumper conduit for optically communicating the jumper conduit with the second optical detector.

11. The device of claim 1, where the storage mechanism further comprises:
    a storage compartment provided within a housing of the device for storing the pulley, the jumper conduit, and the male connector of the jumper conduit.

12. The device of claim 11, where the storage compartment includes a cover for protecting the jumper conduit and the male connector of the jumper conduit provided therein.

13. The device of claim 1, wherein the storage mechanism comprises:
    a handle including arms that extend away from and connect to a housing of the device, wherein the jumper conduit is capable of being wound around and stored on the arms; and
    a storage receiver head providing an opening in the housing of the device to store the male connector of the jumper conduit.

14. The device of claim 1, further comprising:
    control buttons permitting interaction with the device to cause the device to perform one or more operations.

15. The device of claim 1, further comprising:
    a display capable of providing visual information regarding the output of the male network connector and the output of the female network connector.

* * * * *